(12) United States Patent
Kesten et al.

(10) Patent No.: US 7,397,906 B2
(45) Date of Patent: *Jul. 8, 2008

(54) ELECTRONIC DOCUMENT MANAGEMENT SYSTEM AND METHOD

(75) Inventors: Philip Kesten, Sunnyvale, CA (US); Slaven Zivkovic, San Francisco, CA (US); Joel Fajans, Berkeley, CA (US)

(73) Assignee: Docutek Information Systems, Inc., San Mateo, CA (US)

( * ) Notice: Subject to any disclaimer, the term of this patent is extended or adjusted under 35 U.S.C. 154(b) by 962 days.

This patent is subject to a terminal disclaimer.

(21) Appl. No.: 10/653,374

(22) Filed: Sep. 2, 2003

(65) Prior Publication Data

US 2004/0042044 A1 Mar. 4, 2004

Related U.S. Application Data

(63) Continuation of application No. 09/886,670, filed on Jun. 21, 2001, now Pat. No. 6,625,265.

(51) Int. Cl.
*H04M 11/00* (2006.01)

(52) U.S. Cl. .............................. 379/100.11; 379/100.13; 358/403

(58) Field of Classification Search ............ 379/100.11, 379/100.13, 100.01; 358/403, 1.16
See application file for complete search history.

(56) References Cited

U.S. PATENT DOCUMENTS

| 5,760,917 A | 6/1998 | Sheridan |
| 6,040,920 A | 3/2000 | Ichiriki |
| 6,952,281 B1 * | 10/2005 | Irons et al. ................. 358/1.15 |

* cited by examiner

*Primary Examiner*—Stella L Woo
(74) *Attorney, Agent, or Firm*—Workman Nydegger

(57) ABSTRACT

A system and method automating the placement of paper documents into an electronic document management system. A document is faxed to a network server. The network server automatically receives the faxed document and converts it to a pre-determined file format, such as PDF. The converted document is placed in a staging directory including a list of faxed documents. The network server provides a graphical user interface that the transmitting user accesses over the Internet to access the staging directory. The user selects the faxed document from the staging directory, and indicates that it be moved to a particular storage area. The particular storage area may be a course page for a course offered by an educational institution.

19 Claims, 13 Drawing Sheets

Docutek University Library
*Electronic Reserves*

MAIN COURSE INDEX

YOU CAN LOOK UP A COURSE PAGE BY LISTING COURSES BY DEPARTMENT, BY INSTRUCTOR'S LAST NAME, OR USE ERes QuickSearch.

SELECT A DEPARTMENT: —70
[LAW ▸] (GO)

SELECT AN INSTRUCTOR: —72
[CHANG, JOSEPHINE ▸] (GO)

ERes QuickSearch: —74   SEARCH BY: [COURSE ▸]
[_____]  (SEARCH)

ERes
LEARNING NETWORK
CLICK HERE

SEARCH THE WEB:
[_____] (GO)

ERes LINKS
- QuickSearch/COURSE INDEX
- INTERNET RESOURCES
- ADMIN FUNCTIONS
- LOCAL ERes INFO
- CONTACT LOCAL ERes MANAGER
- ERes HOME DU LINKS
- DU HOMEPAGE
- DU LIBRARY
- VIRTUAL REFERENCE LIBRARIAN
- ELECTRONIC DOCUMENT DELIVERY

NEWS & INFORMATION

6/6/01
- *PRIORITY!* BIG NEWS FROM SOUTHERN U

*FIG. 4A*

Docutek University Library
*Electronic Reserves*

LAW COURSES

CLICK ON ANY OF THE LINKS ON A LINE TO DISPLAY THE CORRESPONDING COURSE PAGE:

DISPLAY THE LIST OF LAW INTERNET RESOURCES SUGGESTED BY YOUR LIBRARIANS.

| COURSE NUMBER | COURSE NAME | INSTRUCTOR | TERM |
|---|---|---|---|
| LAW001 | UNDERSTANDING ELECTION LAW | COLSON | WINTER 01 |
| LAW100 | PATENTS | CHANG | SUMMER 01 |
| LAW1010 | EU LAW | ALLEN | FALL 00 |
| LAW1234 | CONSTITUTIONAL LAW | GULNAC | FALL 00 |
| LAW240 | ANTITRUST | GULNAC | SPRING 01 |
| LAW328 | SPORTS LAW | GULNAC | SPRING 01 |
| LAW450 | VOTERS RIGHTS ACCORDING TO THE CONSTITUTION | COLSON, COMBERIATI | WINTER 01 |

80 · 82 · 84 · 86

ERes LEARNING NETWORK CLICK HERE

SEARCH THE WEB: [   ] (GO)

ERes LINKS
- QuickSearch/COURSE INDEX
- INTERNET RESOURCES
- ADMIN FUNCTIONS
- LOCAL ERes INFO
- CONTACT LOCAL ERes MANAGER
- ERes HOME DU LINKS
- DU HOMEPAGE
- DU LIBRARY
- VIRTUAL REFERENCE LIBRARIAN
- ELECTRONIC DOCUMENT DELIVERY

NEWS & INFORMATION

6/6/01
- *PRIORITY!* BIG NEWS FROM SOUTHERN U

*FIG. 4B*

Docutek University Library
*Electronic Reserves*

LAW100 COURSE PAGE  (HELP NAVIGATING THIS PAGE)

INSTRUCTOR(s): JOSEPHINE CHANG
DOCUMENTS: (PROBLEMS VIEWING PDF OR OTHER FILE FORMATS? READ THIS!)

| TITLE | FORMAT | # OF PAGES |
|---|---|---|
| ☐ DRAFTING PATENT APPLICATIONS | PDF | 14 |
| ☐ INTRODUCTION TO PATENT LAW | HMTL | 10 |

ERes
LEARNING NETWORK
CLICK HERE

SEARCH THE WEB: [  ] GO

COURSE PAGE LINKS
- CHAT ROOM
- DISCUSSION BOARD
- PAGE MANAGEMENT

ERes LINKS
- LAW RESOURCES
- COURSE INDEX
- ERes HOME

DU LINKS
- DU HOMEPAGE
- DU LIBRARY
- VIRTUAL REFERENCE LIBRARIAN
- ELECTRONIC DOCUMENT DELIVERY

NEWS & INFORMATION

6/6/01
- *PRIORITY!* BIG NEWS FROM SOUTHERN U

*FIG. 4C*

Docutek
University
Library
*Electronic Reserves*

ERes
LEARNING NETWORK
CLICK HERE

SEARCH THE WEB: [ ] (GO)

THIS LOGIN IS FOR ERes ADMINISTRATORS, FACULTY, LIBRARIANS, AND ASSISTANTS ONLY!

ERes ADMINISTRATION LOGIN

114 — USER NAME: [ ]
116 — PASSWORD: [ ]

[ ] CHECK TO CHANHE PASSWORD OR OTHER LOGIN INFORMATION

118 — (LOGIN)  (CANCEL)

IMPORTANT WARNING: UNLESS OTHERWISE STATED ON SPECIFIC SCREENS, DO NOT USE THE BROWSER BACK FUNCTION TO RETURN PREVIOUSLY DISPLAYED ERes SCREENS!

*FIG. 4D*

Docutek
University
Library
*Electronic Reserves*

ADD A FAX DOCUMENT TO LAW100 - LOGOUT

SELECT A FAX TO TRANSFER:
120

| FILENAME | TIME SINCED FAXED | REMOVE FAX |
|---|---|---|
| ⦿ FAX2001-04-27 13-55-51.PDF | 6 DAYS 3 HOURS 36 MINUTES | DELETE |
| ○ FAX06 02 2001 06 02 30 PM.PDF | 4 DAYS 19 HOURS 34 MINUTES | DELETE |
| ○ FAX06 01 2001 11 19 19 AM.PDF | 6 DAYS 2 HOURS 18 MINUTES | DELETE |

122    124

( CONTINUE )   ( CANCEL )

ERes
LEARNING NETWORK
CLICK HERE

SEARCH THE WEB: [    ] (GO)

HELP BRIEFS

SELECT A FAX DOCUMENT TO ADD TO THE ERes SYSTEM.
THIS SCREEN DISPLAYS THE FILENAME OF TIME ELAPSED SINCE THE FAX WAS RECEIVED.

YOU MAY PREVIEW A DOCUMENT BY CLICKING ON THE FILENAME.

YOU MAY DELETE A DOCUMENT BY CLICKING ON THE "DELETE" LINK NEXT TO IT'S FILENAME.

ONCE YOU HAVE LOCATED THE CORRECT DOCUMENT, SELECT IT USING THE RADIO BUTTON THEN CLICK CONTINUE.

[ MORE HELP ]

*FIG. 4G*

Docutek University Library
*Electronic Reserves*

ERes
LEARNING NETWORK
CLICK HERE

SEARCH THE WEB: [___] (GO)

HELP BRIEFS

MAIN FILE: SELECT THE PRIMARY FILE WHEN MORE THAN ONE HAS BEEN SELECTED TO BE ASSOCIATED WITH A DOCUMENT. NOTE: THIS FIELD IS NOT DISPLAYED IF ONLY ONE FILE IS ASSOCIATED WITH A DOCUMENT.

TITLE: IDENTIFIES DOCUMENT ON COURSE PAGE.

ADD TO FOLDER: SELECT A FOLDER IF AT LEAST ONE EXISTS; CAN BE CHANGED AT ANY TIME.

PASSWORD: OPTIONAL; CAN BE CHANGED AT ANY TIME.

[MORE HELP]

ADD A DOCUMENT – LOGOUT

130 —— DOCUMENT TITLE: [RESPONDING TO OFFICE ACTIONS]
132 —— DOCUMENT PASSWORD: [OFFICE]
134 —— NUMBER OF PAGES: [8]

(CONTINUE)   (CANCEL)

BY CLICKING THE CONTINUE BUTTON YOU AGREE THAT THIS DOCUMENT ABIDES BY THE DOKUTEK UNIVERSITY COPYRIGHT AGREEMENT FOR ELECTRONIC RESERVES.

*FIG. 4H*

Docutek University Library
*Electronic Reserves*

LAW100 COURSE PAGE (HELP NAVIGATING THIS PAGE)
PATENTS (SUMMER 01)

INSTRUCTOR(s): JOSEPHINE CHANG
DOCUMENTS: (PROBLEMS VIEWING PDF OR OTHER FILE FORMATS? READ THIS!)

| TITLE | FORMAT | # OF PAGES |
|---|---|---|
| ☐ DRAFTING PATENT APPLICATIONS | PDF | 14 |
| ☐ INTRODUCTION TO PATENT LAW | HMTL | 10 |
| ☐ RESPONDING TO OFFICE ACTIONS | PDF | 8 |

---

ERes
LEARNING NETWORK
CLICK HERE

SEARCH THE WEB: [   ] (GO)

COURSE PAGE LINKS
- CHAT ROOM
- DISCUSSION BOARD
- PAGE MANAGEMENT

ERes LINKS
- LAW RESOURCES
- COURSE INDEX
- ERes HOME

DU LINKS
- DU HOMEPAGE
- DU LIBRARY
- VIRTUAL REFERENCE LIBRARIAN
- ELECTRONIC DOCUMENT DELIVERY

NEWS & INFORMATION

6/6/01
- *PRIORITY!* BIG NEWS FROM SOUTHERN

*FIG. 4I*

ELECTRONIC DOCUMENT MANAGEMENT SYSTEM AND METHOD

CROSS-REFERENCE TO RELATED APPLICATION

This application is a continuation of U.S. patent application Ser. No. 09/886,670, filed Jun. 21, 2001 now U.S. Pat. No. 6,625,265.

FIELD OF THE INVENTION

This invention relates generally to electronic document management systems, and more particularly, to automating the placement of documents in the electronic document management system.

BACKGROUND OF THE INVENTION

Course materials, for example, documents and other information resources that instructors make available to students, are traditionally kept in binders on a "reserve shelf" of a library. Typical reserve materials consist of copies of previous exams, articles from scientific and trade journals, homework solutions, excerpts from books, and the like. Generally, there is only one copy of a document placed on reserve. Furthermore, such document is traditionally available only for in-library use, on a short-term loan basis.

An emerging solution to the limitations presented in traditional reserve mechanisms involve placing reserve materials on electronic reserve. In fact, with the growth of the Internet, electronic document delivery and storage now extends far beyond course reserves to make all types of documents available electronically. A significant fraction of the documents added to electronic databases, however, exist in an ink-on-paper format. Those who administer such systems, for example, librarians, college faculty, and school teachers, are thus faced with the task of first converting these paper copies to electronic formats, and then transferring the computer file(s) to an Internet server used to house an electronic documents database.

The current two-step process for placing printed materials on electronic reserve is unsatisfactory for many users in that the process may be time-consuming and potentially confusing to an average (non-technical) teacher, librarian, or administrator. Both the scanning and the file transfer steps require some, if not considerable, technical expertise. Even someone skilled in the use of a scanner may sometimes struggle to create output files that are both of manageable size and of high display quality. Many times, post-scanning image processing may be necessary to either reduce the size of the output files and/or make them more legible. Such post-scanning image processing is time consuming and also requires some technical knowledge.

Accordingly, there is a need for a system and method for automating the placement of documents into an electronic reserves system. Such a system and method should preferably cater to the needs of people with little or no technical expertise to facilitate the electronic placement of such documents.

SUMMARY OF THE INVENTION

The present invention is directed to an electronic document management system that includes an input automatically receiving a facsimile transmission of a document, a data store, and a processor coupled to the input and the data store. The processor is configured to automatically format the received document into a pre-determined format; save the formatted document into a first storage area of the data store; display a list of documents in the first storage area; receive a user selection of the formatted document from the list of documents; receive a user selection of a second storage area of the data store; and automatically move the formatted document from the first storage area to the second storage area.

In another embodiment, the present invention is directed to a method for electronic document management that includes automatically receiving a facsimile transmission of a document; automatically formatting the received document into a pre-determined format; saving the formatted document into a first storage area of a data store; displaying a list of documents in the first storage area; receiving a user selection of the formatted document from the list of documents; receiving a user selection of a second storage area; and automatically moving the formatted document from the first storage area to the second storage area.

In a further embodiment, the present invention is directed to an article of manufacture comprising a computer readable medium having computer usable program code containing executable instructions that, when executed, cause a computer to perform the steps of: automatically receiving a facsimile transmission of a document; automatically formatting the received document into a pre-determined format; saving the formatted document into a first storage area of a data store; displaying a list of documents in the first storage area; receiving a user selection of the formatted document from the list of documents; receiving a user selection of a second storage area; and automatically moving the formatted document from the first storage area to the second storage area.

It should be appreciated, therefore, that the present invention helps simplify the placing of paper documents into an electronic document management system. The users need no longer struggle with scanners, post-scanning devices, and manual file transfers which may be confusing and time-consuming for people with little or no technical expertise. Instead, a faxed document is automatically received by the network server, formatted, and stored electronically.

DESCRIPTION OF THE DRAWINGS

These and other features, aspects and advantages of the present invention will be more fully understood when considered with respect to the following detailed description, appended claims, and accompanying drawings where:

FIGS. 4A-4J are a series of graphical user interface displays allowing a user to interact with the network server of FIG. 2.

DESCRIPTION OF THE INVENTION

Figure 1:
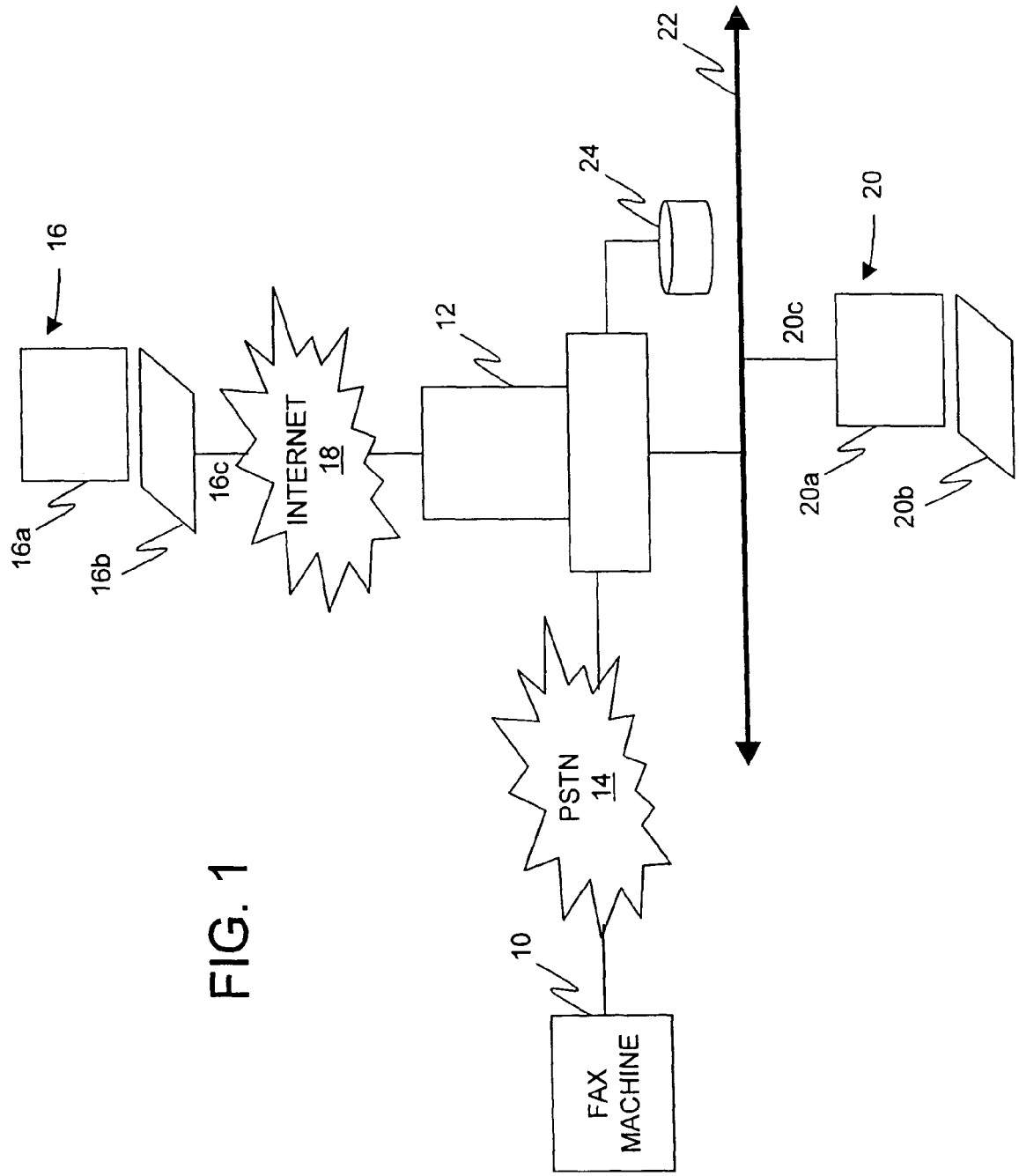
FIG. 1 is a schematic block diagram of an automated electronic reserves system according to one embodiment of the invention.

FIG. 1 is a schematic block diagram of an automated electronic reserves system according to one embodiment of the invention. The system preferably includes a facsimile machine 10 connected to a network server 12 over a public switched telephone network (PSTN) 14. The network server 12 preferably resides in a high school, university, college, or another institution where printed materials are either kept on a reserve shelf or placed on electronic reserve.

The system preferably includes a personal computer (PC) 16 connected to the network server 12 via a wide area computer network, such as, for example, a public internet 18. The network server 12 and PC 16 and may be connected via cables or other transmission media, and may support various data communication protocols such as, for example, an Internet Protocol (IP), Asynchronous Transfer Mode (ATM), or the like.

The system may further include a local PC 20 connected to the network server 14 over a network signal bus 22 configured to support and operate as a local area network. The particular configuration of the local area network may be any one of a number of conventional network configurations, whether serial or parallel, such as token-passing architectures, RS-232-type serial daisy-chains, serial arbitrated loops, and the like.

The PCs 16, 20 are configured to include at least a display screen 16a, 20a, some form of I/O device 16b, 20b, such as a keyboard, keypad, and the like, and a network connection 16c, 20c for bi-directional communication with the network server 12. In alternative embodiments, the PCs 16, 20 may be replaced or used in conjunction with other end devices such as, for example, mainframes, file servers, workstations, business computers, personal digital assistants, television/set-top-box units, or the like.

The network server 12 preferably includes a mass storage device 24, such as a hard disk drive, or drive array, which stores documents placed on electronic reserve as well as other information and/or documents used by the network server. The documents placed or to-be-placed on electronic reserve are preferably arranged in one or more directories, including a temporary directory, a staging directory, and one or more final reserves directories. The mass storage device 24 preferably maintains for each document placed on electronic reserve, a document title, a total number of pages contained in the document, a document file format, an associated password, and the like.

The mass storage device 24 further includes user databases storing user authentication information, such as, for example, usernames and passwords, for allowing access to particular parts of the system. Preferably, the user database indicates whether a user is an administrator, and provides administrative rights, such as creating course pages and placing documents on reserve, to such administrative users.

In general terms, an authorized administrative user of the system transmits a document to the network server 12 for being placed on electronic reserve, preferably through the facsimile machine 10. The document includes but is not limited to library documents, faculty and course materials, copies of previous exams, articles from scientific and trade journals, homework solutions, excerpts from books, and/or any other type of printed material.

Alternatively, the document is a file residing in a remote location in PC 16 or in a local area network in PC 20. The file may be uploaded to the network server 12 via the internet 18 or network signal bus 22, respectively. If the file resides in PC 16, the document is preferably transmitted using a TCP/IP based file transfer protocol (FTP). A third-party FTP application or an internal FTP code may be involved to transfer the file to the network server 12. Alternatively, PC 16 or 20 is equipped with a facsimile modem which allows a document to be faxed to the network server 18 using the PC.

The network server 12 receives a faxed document and stores it into the temporary directory. The document is then preferably converted to a pre-determined file format, such as, for example, a portable document format (PDF), and moved to the staging directory under a new file name. The user may access the faxed document in the staging directory via a graphical user interface (GUI) provided by the network server 12 for moving the document from the staging directory to a final reserves directory. The user may, prior to moving the document to the final reserves directory, use the user interface to view the document to verify that the transmission was successful. The final reserves directory may be a general directory or a directory associated with a particular course page.

Once the documents have been placed in a final reserves directory, an authorized user may access the documents using PC 16 or 20 through the internet 18 or local area network. Preferably, the user may select, view, and/or print a document placed on electronic reserve via the GUI provided by the network server 12.

Figure 2:
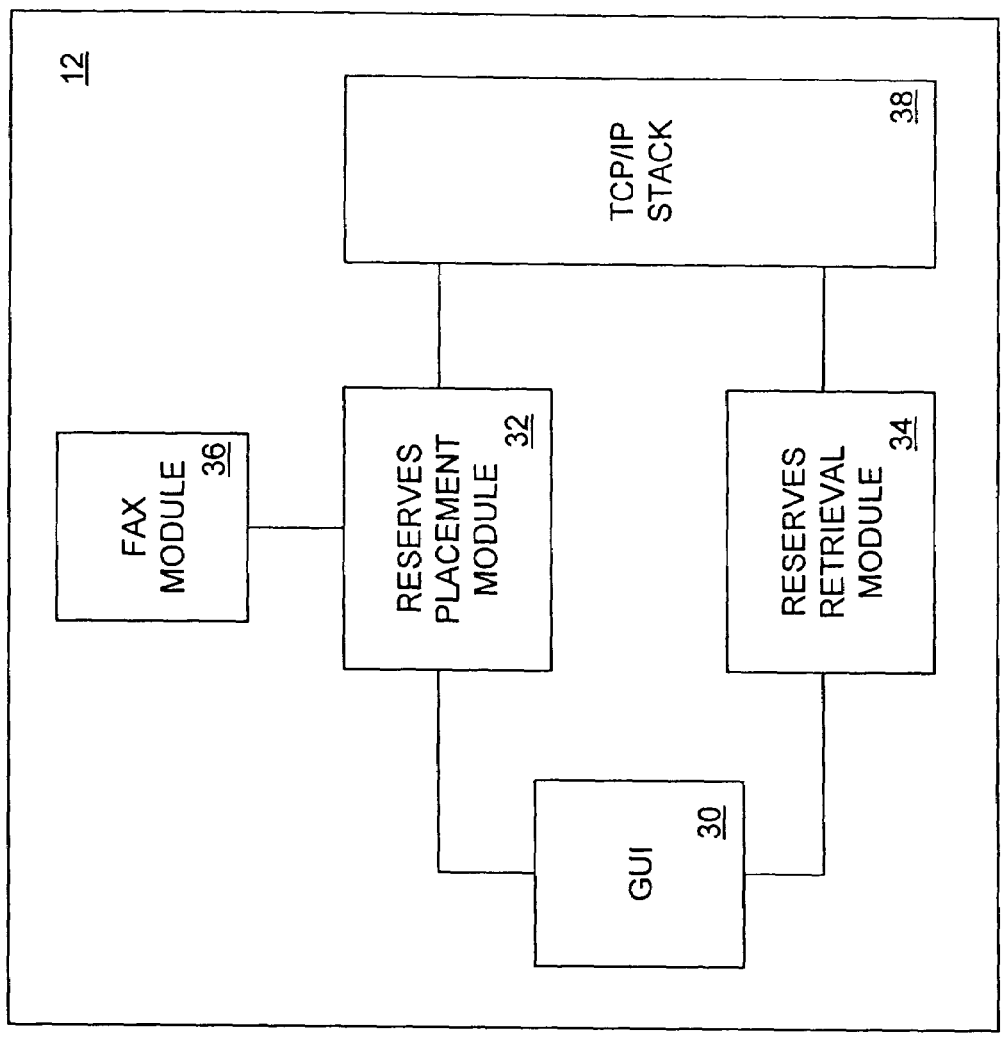
FIG. 2 is a more detailed block diagram of a network server in the electronic reserves system of FIG. 1 according to one embodiment of the invention.

FIG. 2 is a more detailed block diagram of the network server 12 according to one embodiment of the invention. The network server 12 preferably includes a processor including a GUI module 30, reserves placement module 32, reserves retrieval module 34, fax module 36, and TCP/IP stack 38. The GUI module 30 is coupled to the reserves placement and retrieval modules 32, 34, and provides various interactive screens for allowing a user of the PC 16 or 20 to interact with the network server 12 to place or retrieve documents on reserve and perform various administrative functions. One such administrative function includes the creation of course pages to which a reserved document may be added.

The reserves placement module 32 preferably processes a received document for placing it in electronic reserve. Preferably, the reserves placement module 32 converts a faxed document into a pre-determined file format, such as for example, PDF, and stores it in the staging directory. The reserves placement module 32 may include commercially available third-party software such as, for instance, Adobe® Acrobat® Distiller®, manufactured by Adobe Systems Incorporated, of San Jose, Calif., for formatting the faxed document. The reserves placement module 32 preferably further renames the faxed document for easy identification and access by the transmitting user. The reserves placement module also allows an authorized user to move faxed documents from the staging directory into a final reserves directory.

The reserves retrieval module 34 allows a user to retrieve a document from a final reserves directory. The reserves retrieval module 34 receives a user-selection of a particular document placed on electronic reserve and determines if the user is authorized to access the selected document. If the user is authorized, the reserves retrieval module 34 retrieves the document from the mass storage device 22 for display on the display monitor 16a or 20a.

The reserves placement and retrieval modules 32, 34 are each coupled to the TCP/IP stack 32 for communicating over the Internet. The TCP/IP stack 32 processes packets received and transmitted between the PC 16 and network server 12 according to conventional methods. The TCP/IP stack preferably includes a built-in FTP code for allowing the uploading of a document to be placed on reserve using FTP.

The reserves placement module 32 is also coupled to the fax module 36. The fax module 36 preferably allows the receipt of fax documents transmitted by the facsimile machine 10, PC 16, or PC 20. The fax module may be implemented using a commercially available third-party software such as, for instance, WinFax PRO™, manufactured by Symantec Corporation of Cupertino, Calif.

It is understood, of course, that FIG. 2 illustrates a block diagram of the network server 12 without obfuscating inventive aspects of the present invention with additional elements and/or components which may be required by the network server. These additional elements and/or components, which are not shown in FIG. 2 are well known to those skilled in the art.

Figure 3:
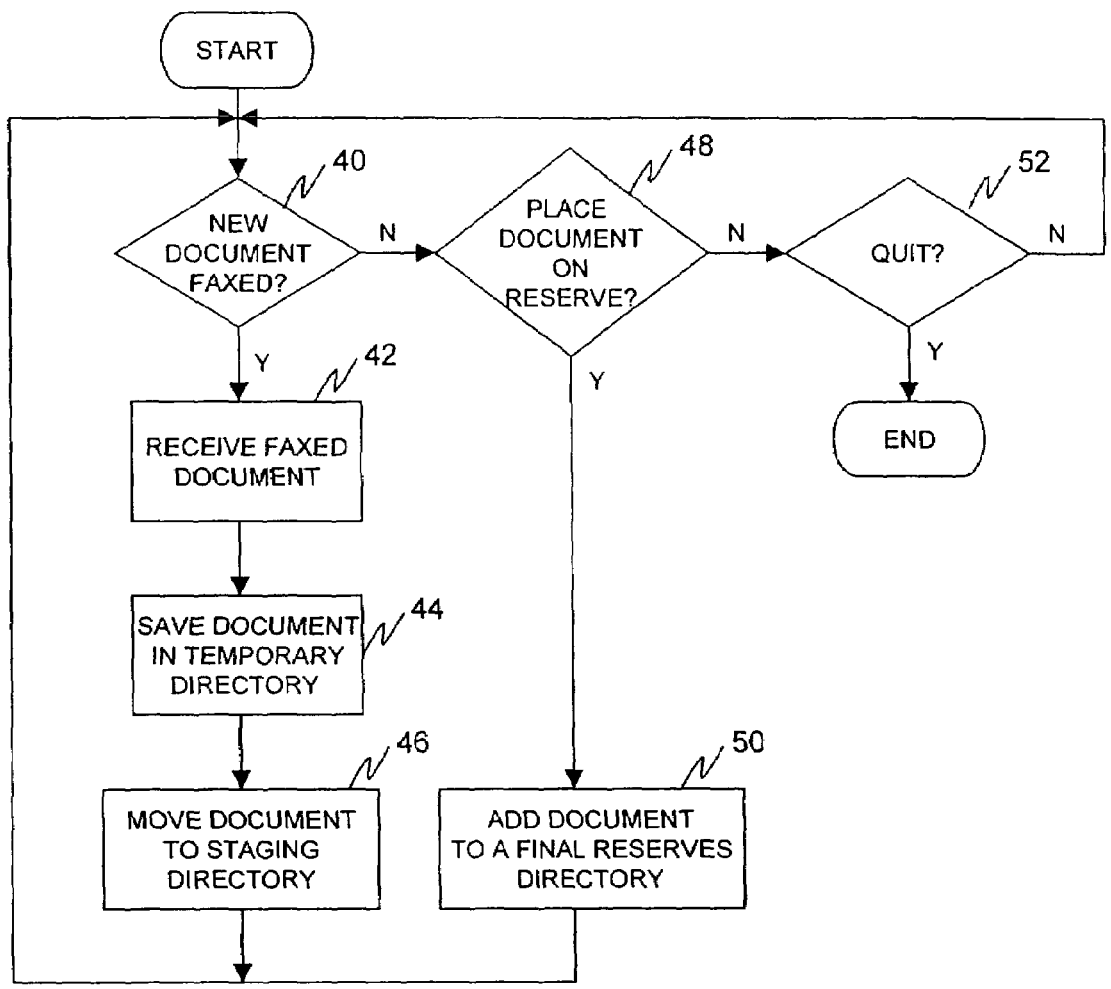
FIG. 3 is a flow diagram of a process for receiving, processing, and retrieving faxed documents on electronic reserve according to one embodiment of the invention.

FIG. 3 is a flow diagram of a process of receiving, processing, and retrieving faxed documents on electronic reserve according to one embodiment of the invention. The process starts, and in step 40, the fax module 36 in the network server 12 determines whether a new document has been faxed. If it has, the fax module 36, in step 42, proceeds to receive the faxed document. In step 44, the network server 12 stores the received document in a temporary directory in the mass storage device 24. In step 46, the network server 12 invokes the reserves placement module 34 for converting the faxed document to a pre-determined file format, renaming the converted document, and saving the document in the staging directory of the mass storage device 24. Preferably, the document is renamed based on a date and time of receipt of the faxed document for allowing the transmitting user to easily identify the document.

In step 48, the network server 12 determines if a received document is to be placed on a final reserves directory. If it is, the network server 12, in step 50, places the document into the final reserves directory.

In step 52, the network server 12 determines whether the user has decided to log out or otherwise quit or cancel a particular task. If the answer is YES, the user is logged out or a particular task is canceled, and the process ends.

FIGS. 4A-4J are a series of graphical user interface displays allowing a user to interact with the network server 12. The graphical user interface displays are preferably web pages associated with a website hosted by the network server. The user preferably connects to the network server via the internet 18 using the PC 16 to access the website and the various web pages.

FIG. 4A illustrates a course index display allowing a user to search for a particular course. The user may search for the course by selecting a particular department 70 and/or instructor 72, if known, or directly entering the name of the desired course 74. If the user searches by a particular department or instructor, a list of courses offered by such department or instructor is preferably displayed.

FIG. 4B illustrates a display of various courses offered by a particular department. Preferably, the courses are organized based on a course number 80, course name 82, instructor name 84, and school term 86 offering the course. A user may select a particular course for placing or viewing a document on electronic reserve for the course.

FIG. 4C is an illustration of a particular course page including a list of documents placed on reserve for the course. Preferably, the documents are identified by a title 90, file format 92, and a total number of pages 94. An administrative user of the system, such as, for example, a faculty member or librarian, may select a course to place a document on reserve upon actuation of a page management link 96.

FIG. 4D illustrates an administrative login screen display allowing the administrative user to access the system for placing documents on reserve for the selected course. In this regard, the administrative user enters his or her username 114 and password 116, and actuates a login radio button 118, causing the information to be transmitted to the network server 12 over the internet 18. The reserves placement module 32, or alternatively, a separate authentication module, determines if the transmitted information may be verified. If the information is verified, the user allows access to the system to perform document management functions.

Figure 4E:
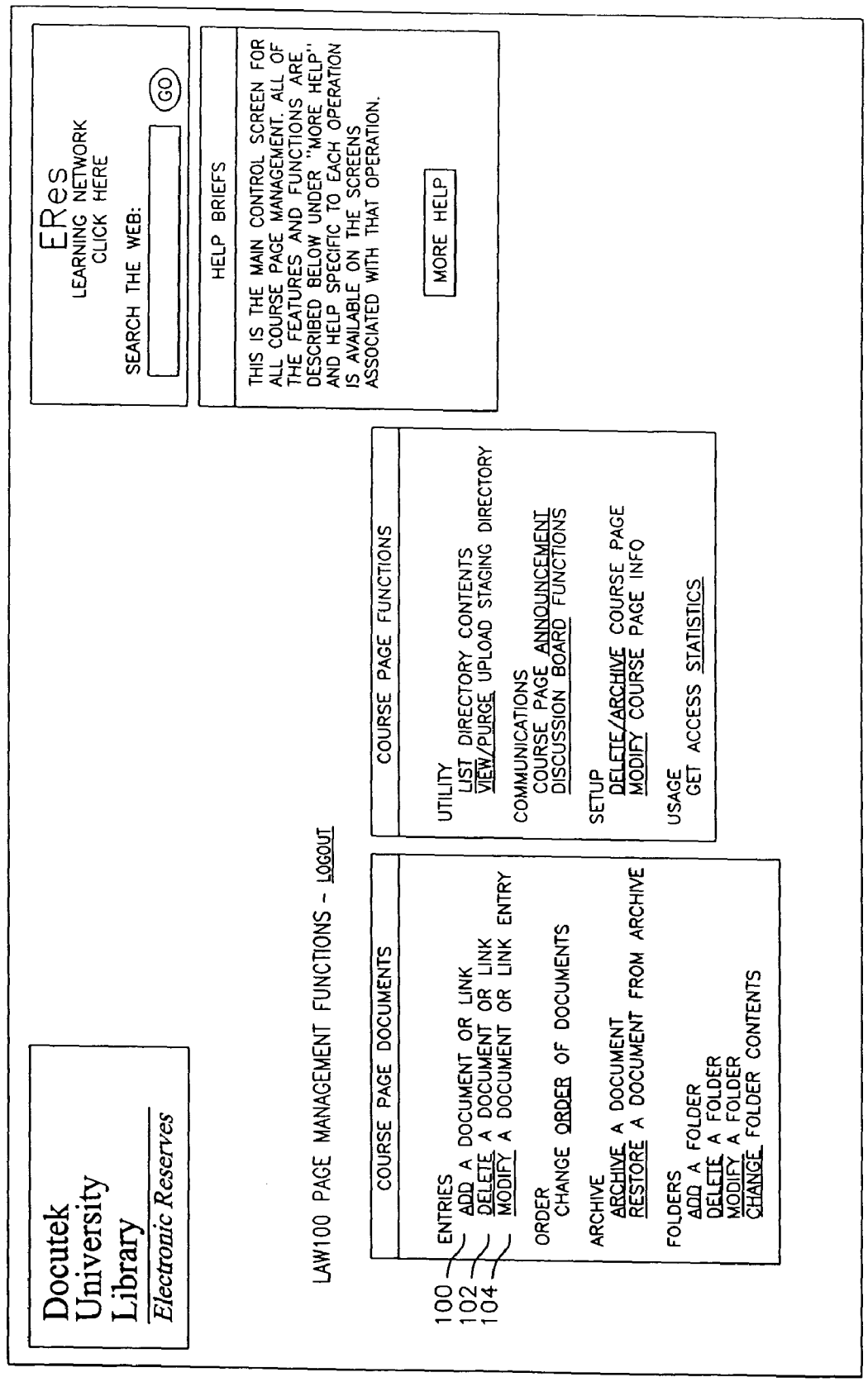

FIG. 4E is an illustration of a screen providing access to the various document management functions according to one embodiment of the invention. The management functions may include adding, deleting, or modifying a document or link entry in the course page upon actuation of an add link 100, delete link 102, and modify link 104, respectively.

Figure 4F:
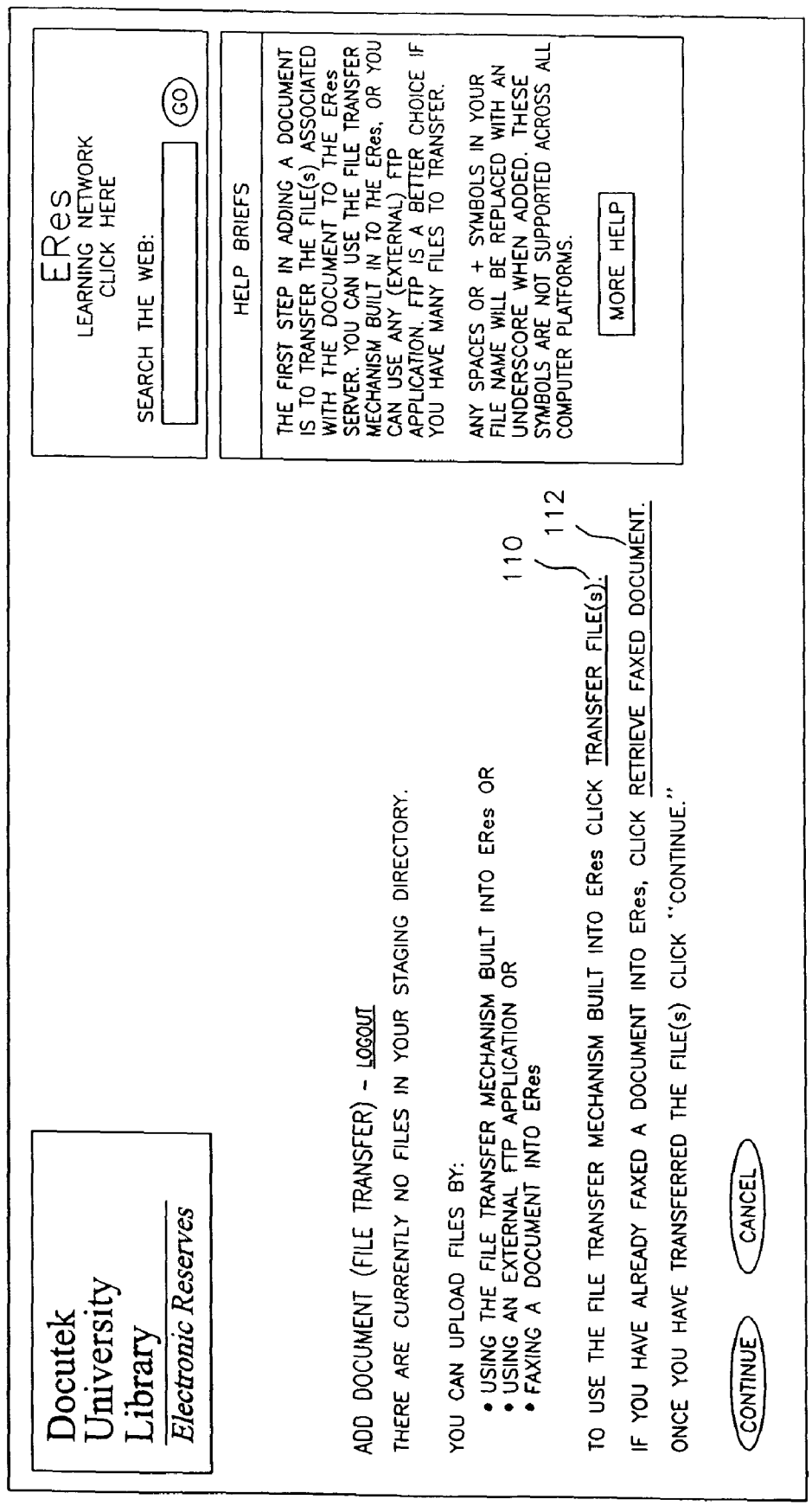

FIG. 4F illustrates a screen display upon actuation of the add link 100 for allowing the administrative user to place a document on electronic reserve. The administrative user may upload the document to the network server 12 over the internet by actuating a transfer file link 110 on the displayed screen. If a particular document has previously been faxed, it is stored in the staging directory and the user may retrieve the faxed document by selecting a retrieve faxed document link 112.

FIG. 4G is an illustration of a screen display including a list of faxed documents in the staging directory. Preferably, each document in the staging directory adheres to a pre-determined file format. Each document is further identified by a filename 120 indicating the date and time in which the document was received. The display further indicates the time that has elapsed 122 since the document was received. The document may be removed 124 from the staging directory or selected for transferring to a final reserves directory associated with the course page. The user may further preview the document prior to transferring it to the final reserves directory.

FIG. 4H is an illustration of a screen display upon a user selection of a document in the staging directory for transferring it into a final reserves directory associated with the selected course. The administrative user preferably provides a document title 130 by which the document is to be identified on the course page, and the number of pages 134 contained in the document. In addition, the administrative user provides a document password 132 that is to be used for accessing the document once it is placed on reserve.

Figure 4J:
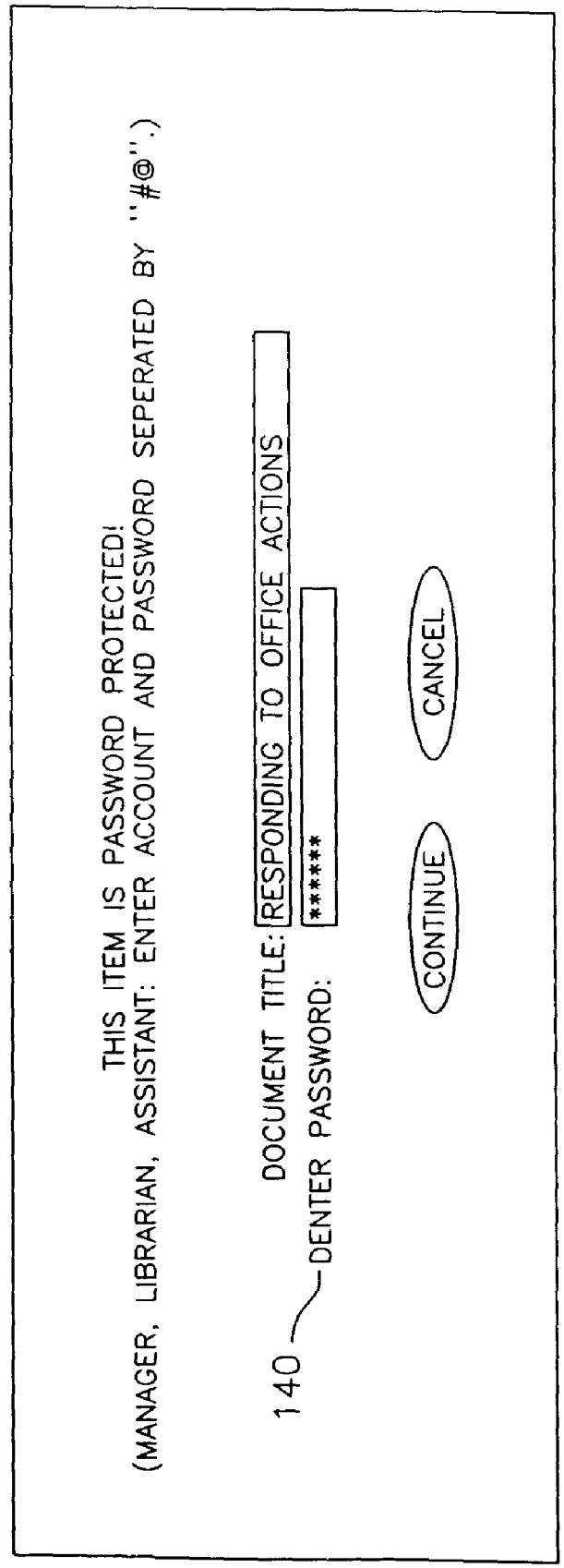

FIG. 4I is an illustration of a screen display with an updated list of documents that have been placed on electronic reserve. Selection of one of the documents preferably causes the display of a display screen as illustrated in FIG. 4J for allowing the user to enter a password 140 to access the document. The password is transmitted to the reserves retrieval module 34 which preferably verifies that the appropriate password has been provided. If the password is verified, the reserves retrieval module 34 retrieves the document from the mass storage device 24 and displays it on the user's display 16*a* or 20*a*.

It should be appreciated, therefore, that the present invention helps simplify the placing of paper documents in electronic reserve. The users need no longer struggle with scanners, post-scanning devices, and manual file transfers which may be confusing and time-consuming for people with little or no technical expertise. Instead, a faxed document is automatically received by the network server, formatted, and placed on reserve. The graphical user interface further provides ease and convenience in placing a document on electronic reserve.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

The invention claimed is:

1. An electronic document management system comprising:
   a fax module which is configured for receiving a facsimile transmission of a document;
   a data store;
   a processor; and
   additional modules coupled to the fax module, the processor and the data store, wherein the processor and additional modules are configured to implement a method comprising:
      saving the document, which is received by the fax module, within a first storage area comprising a temporary directory of the data store;
      automatically converting the faxed document from a first format into a formatted document having a predetermined format;
      renaming the formatted document from a first name to a second name;
      saving the formatted document into a second storage area of the data store, the second storage area comprising a staging area;
      receiving a user selection of the formatted document from a plurality of documents identified within the staging area;
      receiving a user selection of a third storage area of the data store, the third storage area comprising a final reserve directory; and
      in response to the user selections, moving the formatted document from the second storage area, comprising the staging area, to the third storage area, comprising the final reserve directory.

2. The system of claim 1, wherein the method further includes associating the formatted document with information on when the facsimile transmission was received.

3. The system of claim 1, wherein the method further includes assigning a password to the formatted document.

4. The system of claim 1, wherein the method further includes:
   receiving the assigned password; and
   retrieving the formatted document from the data store in response to the receipt of the assigned password.

5. The system of claim 1, wherein the third storage area of the data store, comprising the final reserve directory, is associated with a particular course offered by an educational institution, and the formatted document is a material associated with the course.

6. The system of claim 1 further including a network connection for receiving the document over a computer network.

7. A method for electronic document management comprising:
   receiving a facsimile transmission of a document;
   saving the document within a first storage area of a data store, the first storage area comprising a temporary directory;
   automatically converting the document from a first format into a formatted document having a predetermined format;
   renaming the formatted document from a first name to a second name;
   saving the formatted document into a second storage area of the data store, the second storage area comprising a staging area;
   receiving a user selection of the formatted document from a plurality of documents identified within the staging area;
   receiving a user selection of a third storage area of the data store, the third storage area comprising a final reserve directory; and
   in response to the user selections, moving the formatted document from the second storage area, comprising the staging area, to the third storage area, comprising the final reserve directory.

8. The method of claim 7 further comprising associating the formatted document with information on when the facsimile transmission was received.

9. The method of claim 8 further comprising assigning a password to the formatted document.

10. The method of claim 9 further comprising:
    receiving the assigned password; and
    retrieving the formatted document from the data store in response to the receipt of the assigned password.

11. The method of claim 7, wherein the third storage area is associated with a course offered by an educational institution, and the document is a material associated with the course.

12. A method as recited in claim 11, wherein the user selection of the third storage area further includes a user selection of the course from the staging area, wherein the course comprises one of a plurality of educational courses for which the document can be reserved for authorized access.

13. A method as recited in claim 11, wherein the final reserve directory comprises a general directory.

14. A method as recited in claim 7, wherein the method further includes receiving a title for the formatted document prior to moving the formatted document to the final reserve directory, the title being distinguished from the second name, the title being used to identify the formatted document within an interface associated with the final reserve directory and particular education course.

15. An article of manufacture comprising a computer readable medium having computer usable program modules containing executable instructions that, when executed, cause a computer to perform a method comprising:
    receiving a facsimile transmission of a document;
    saving the document within a first storage area of a data store, the first storage area comprising a temporary directory;
    automatically converting the document from a first format into a formatted document having a predetermined format;
    renaming the formatted document from a first name to a second name;
    saving the formatted document into a second storage area of the data store, the second storage area comprising a staging area;
    receiving a user selection of the formatted document from a plurality of documents identified within the staging area;
    receiving a user selection of a third storage area of the data store, the third storage area comprising a final reserve directory; and
    in response to the user selections, moving the formatted document from the second storage area, comprising the staging area, to the third storage area, comprising the final reserve directory.

16. The article of manufacture of claim 15, wherein the method further includes associating the formatted document with information on when the facsimile transmission was received.

17. The article of manufacture of claim 15, wherein the method further includes assigning a password to the formatted document.

18. The article of manufacture of claim 17, wherein the method further includes:

receiving the assigned password; and retrieving the formatted document from the data store in response to the receipt of the assigned password.

19. The article of manufacture of claim 15, wherein the third storage area is associated with a course offered by an educational institution, and the document is a material associated with the course.

* * * * *

UNITED STATES PATENT AND TRADEMARK OFFICE
CERTIFICATE OF CORRECTION

PATENT NO. : 7,397,906 B2
APPLICATION NO. : 10/653374
DATED : July 8, 2008
INVENTOR(S) : Kesten et al.

It is certified that error appears in the above-identified patent and that said Letters Patent is hereby corrected as shown below:

<u>Column 3</u>
Line 6, remove "and" after "16"
Line 12, change "14" to --12--

<u>Column 4</u>
Line 50, change "22" to --24--
Lines 53 and 54, change "32" to --38--

Signed and Sealed this

Fourth Day of August, 2009

JOHN DOLL
*Acting Director of the United States Patent and Trademark Office*